(12) United States Patent
Sasahara et al.

(10) Patent No.: US 12,345,618 B2
(45) Date of Patent: Jul. 1, 2025

(54) FLOW PATH DEVICE FOR SEPARATING TARGET PARTICLES IN A FLUID

(71) Applicant: KYOCERA CORPORATION, Kyoto (JP)

(72) Inventors: Masamitsu Sasahara, Omihachiman (JP); Jumpei Nakazono, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 280 days.

(21) Appl. No.: 17/912,852

(22) PCT Filed: Mar. 17, 2021

(86) PCT No.: PCT/JP2021/010733
§ 371 (c)(1),
(2) Date: Sep. 20, 2022

(87) PCT Pub. No.: WO2021/193265
PCT Pub. Date: Sep. 30, 2021

(65) Prior Publication Data
US 2023/0152191 A1    May 18, 2023

(30) Foreign Application Priority Data
Mar. 24, 2020   (JP) ................................. 2020-052362

(51) Int. Cl.
*G01N 1/22* (2006.01)
*G01N 15/00* (2006.01)
*G01N 15/06* (2006.01)

(52) U.S. Cl.
CPC ... *G01N 1/2205* (2013.01); *G01N 2015/0046* (2013.01); *G01N 15/06* (2013.01)

(58) Field of Classification Search
CPC ............. G01N 27/44791; B01L 3/5027; B01L 3/52784; B01L 3/502792
See application file for complete search history.

(56) References Cited

U.S. PATENT DOCUMENTS 6,150,180 A  * 11/2000 Parce ..................... B01L 3/5025
                                                          436/514
8,124,026 B2 *  2/2012 Lauks ................. B01L 3/50273
                                                          204/600

(Continued)

FOREIGN PATENT DOCUMENTS

EP           1635170 A1      3/2006
WO       2019151150 A1      8/2019

*Primary Examiner* — Tran M. Tran
(74) *Attorney, Agent, or Firm* — HAUPTMAN HAM, LLP

(57) ABSTRACT

A second device includes a first surface, a second surface in contact with a first device, and a first hole extending through and between the first and second surfaces and being continuous with a groove on the first device. A third device includes a third surface in contact with the first surface, a second hole open in the third surface and continuous with the first hole, and a flow path continuous with the second hole and open in the third surface. As viewed in a first direction from the first to second surfaces, the second hole has a diameter greater than a width of the flow path. The first hole has a greater diameter than the second hole. The second hole has a center surrounded by the first hole. The flow path intersects with the first hole at not more than one point or does not intersect with it.

16 Claims, 14 Drawing Sheets

(56) References Cited

U.S. PATENT DOCUMENTS

| | | | |
|---|---|---|---|
| 8,920,020 B2* | 12/2014 | Noishiki | B01J 19/00 |
| | | | 366/181.5 |
| 9,463,459 B2* | 10/2016 | Ono | B01L 3/502738 |
| 9,855,554 B2* | 1/2018 | Ingber | B01L 3/56 |
| 10,100,949 B2* | 10/2018 | Takano | B81B 3/00 |
| 10,293,339 B2* | 5/2019 | Ingber | B01L 3/502707 |
| 11,015,161 B2* | 5/2021 | Borenstein | B01L 3/502753 |
| 11,772,095 B2* | 10/2023 | Liu | B01L 3/502761 |
| | | | 422/502 |
| 2010/0291588 A1 | 11/2010 | Mcdevitt et al. | |
| 2010/0294811 A1* | 11/2010 | Akechi | B01L 3/502715 |
| | | | 422/521 |
| 2012/0125773 A1* | 5/2012 | Nakayama | G01N 27/44791 |
| | | | 204/451 |
| 2015/0111196 A1* | 4/2015 | Xia | B01L 3/502715 |
| | | | 435/5 |
| 2016/0325278 A1* | 11/2016 | Takagi | B01L 3/502707 |
| 2018/0224409 A1* | 8/2018 | Sameshima | B01D 15/18 |
| 2019/0120867 A1* | 4/2019 | Takamatsu | G01N 37/00 |
| 2019/0369046 A1* | 12/2019 | Ichiki | B01L 3/50273 |
| 2020/0330992 A1 | 10/2020 | Yoneta et al. | |
| 2021/0154665 A1* | 5/2021 | Ikeda | G01N 27/128 |
| 2023/0044915 A1* | 2/2023 | De Greve | B01L 3/50273 |

* cited by examiner

FLOW PATH DEVICE FOR SEPARATING TARGET PARTICLES IN A FLUID

CROSS-REFERENCE TO RELATED APPLICATION

The present application is a National Phase entry based on PCT Application No. PCT/JP2021/010733 filed on Mar. 17, 2021, entitled "FLOW PATH DEVICE", which claims the benefit of Japanese Patent Application No. 2020-052362, filed on Mar. 24, 2020, entitled "FLOW PATH DEVICE".

TECHNICAL FIELD

Embodiments of the present disclosure relate generally to a flow path device.

BACKGROUND

Techniques have been developed for separating a specific type of particles (hereafter, separating target particles) from other types of particles in a fluid containing multiple types of particles and for performing a predetermined process on separating target particles (e.g., WO 2019/151150). A device for separating target particles in a fluid may include different components from a device for evaluating separated particles.

SUMMARY

A flow path device includes a first device including a groove, a second device including a first surface, a second surface opposite to the first surface and in contact with the first device, and a first hole extending through and between the first surface and the second surface and being continuous with the groove, and a third device including a third surface in contact with the first surface, a second hole open in the third surface and continuous with the first hole, and a flow path continuous with the second hole and open in the third surface.

As viewed in a first direction from the first surface to the second surface, the second hole has a diameter greater than a dimension of the flow path in a third direction orthogonal to a second direction in which the flow path extends. The first hole has a diameter greater than the diameter of the second hole.

In a first aspect of the flow path device, the second hole has a center surrounded by the first hole. The flow path intersects with the first hole at not more than one point or does not intersect with the first hole.

In a second aspect of the flow path device, the second hole has an edge intersecting with an edge of the flow path at two intersections. At least one of the two intersections is located outward from an edge of the first hole.

DESCRIPTION OF EMBODIMENTS

Figure 1:
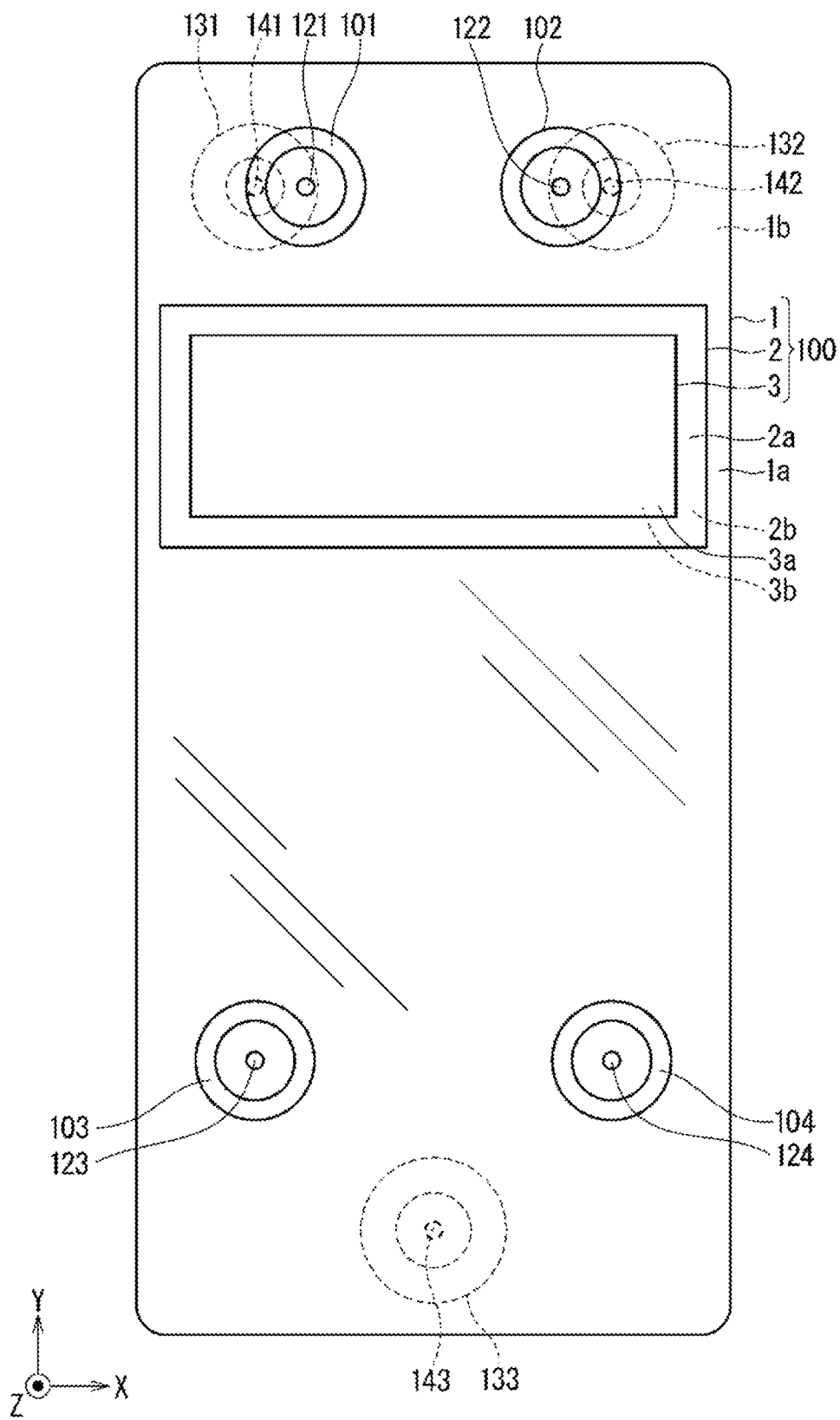
FIG. 1 is a schematic plan view of a flow path device according to an embodiment as viewed vertically downward (in the −Z direction).

Various embodiments and variations are described below with reference to the drawings. Throughout the drawings, components with the same or similar structures and functions are given the same reference numerals and will not be described repeatedly. The drawings are schematic.

The drawings include the right-handed XYZ coordinate system for convenience. The Z direction herein is defined as the vertically upward direction. A first direction may be the vertically downward direction. The vertically downward direction is also referred to as the −Z direction. A second direction may be the X direction. The direction opposite to the X direction is also referred to as the −X direction. A third direction may be the Y direction. The direction opposite to the Y direction is also referred to as the −Y direction.

The flow path herein has a structure that allows a fluid to flow. The dimension of the flow path in the direction orthogonal to the direction in which the flow path extends is referred to as the width of the flow path.

1. Example Structure

FIG. 1 is a plan view of a flow path device 100 according to an embodiment. The flow path device 100 includes a processing device 1, a connection device 2, and a separating device 3. The processing device 1, the connection device 2, and the separating device 3 are stacked in this order in the Z direction.

The processing device 1 includes surfaces 1a and 1b. The surface 1a is located in the Z direction from the surface 1b. The connection device 2 includes surfaces 2a and 2b. The surface 2a is located in the Z direction from the surface 2b. The surface 2b is in contact with the surface 1a. The surface 2b is bonded to the surface 1a with, for example, plasma or light.

The separating device 3 includes surfaces 3a and 3b. The surface 3a is located in the Z direction from the surface 3b. The surface 3b is in contact with the surface 2a. The surface 3b is bonded to the surface 2a with, for example, plasma or light.

For bonding with plasma, for example, oxygen plasma is used. For bonding with light, for example, ultraviolet light from an excimer lamp is used.

Each of the processing device 1, the connection device 2, and the separating device 3 is a rectangular plate as viewed in plan (hereafter, as viewed in the −Z direction unless otherwise specified). The surfaces 1a, 1b, 2a, 2b, 3a, and 3b are orthogonal to the Z direction.

Figure 2:
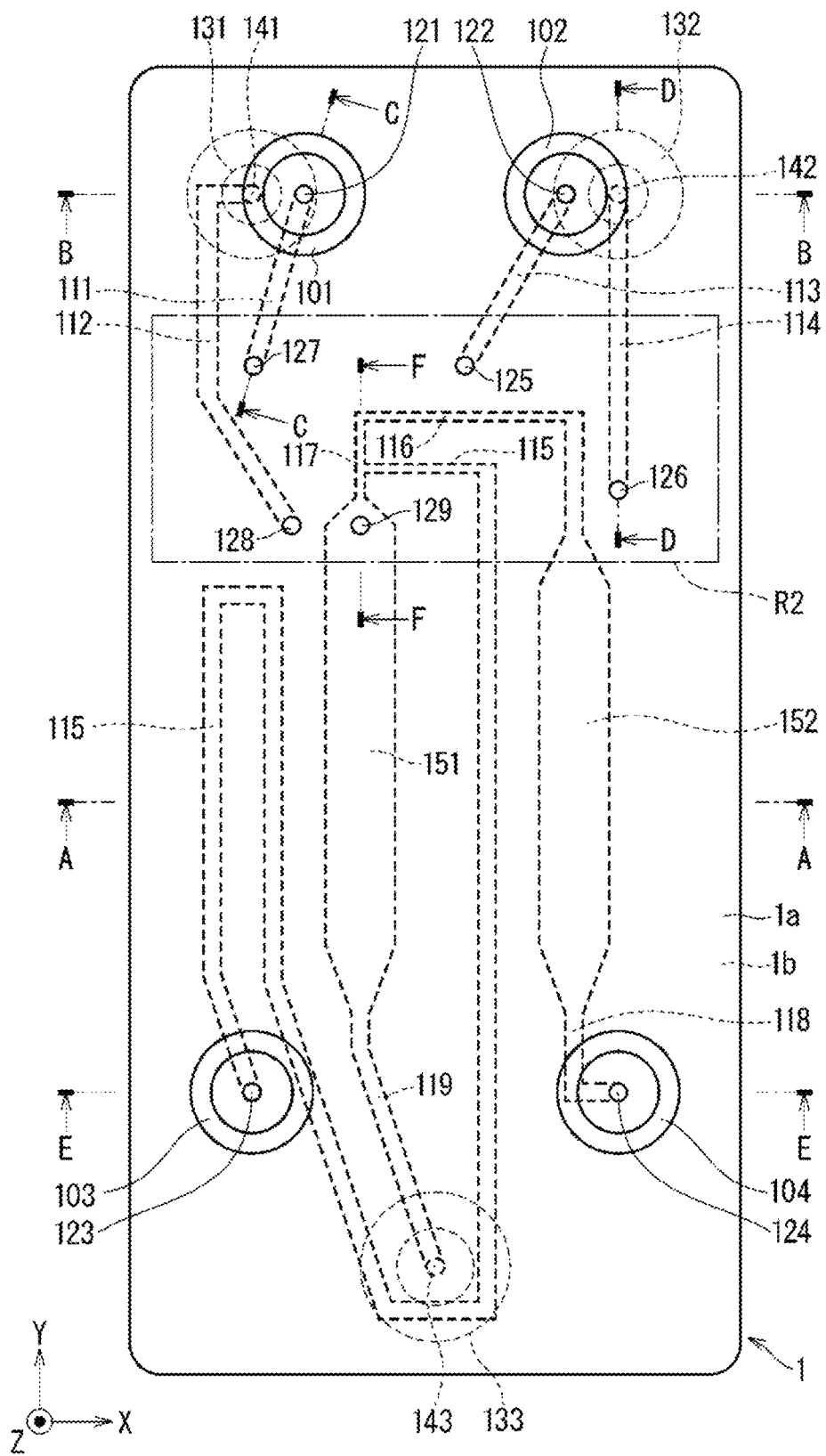
FIG. 2 is a schematic plan view of a processing device as viewed vertically downward (in the −Z direction).

FIG. 2 is a plan view of the processing device 1. The dot-dash line indicates an area R2 at which the surface 2b of the connection device 2 is to be bonded. The processing device 1 has a thickness (a dimension in the Z direction) of, for example, about 0.5 to 5 mm (millimeters). The surfaces 1a and 1b each have a width (a dimension in the X direction) of, for example, about 10 to 30 mm. The surfaces 1a and 1b each have a length (a dimension in the Y direction) of, for example, about 20 to 50 mm.

The processing device 1 includes entry holes 121, 122, 124, 126, 128, and 129, exit holes 125 and 127, and a mixing-fluid hole 123. The entry holes 126, 128, and 129 and the exit holes 125 and 127 are open in the surface 1a in the area R2. The entry holes 121, 122, and 124 and the mixing-fluid hole 123 are open in the surface 1a outside the area R2. The entry holes 121, 122, 124, 126, 128, and 129, the exit holes 125 and 127, and the mixing-fluid hole 123 are not open in the surface 1b.

The processing device 1 includes exit holes 141, 142, and 143. The exit holes 141, 142, and 143 are open in the surface 1b outside the area R2 as viewed in plan. The exit holes 141, 142, and 143 are not open in the surface 1a.

The processing device 1 includes a mixing flow path 115, flow paths 111, 112, 113, 114, 116, 117, 118, and 119, a measurement flow path 151, and a reference flow path 152. The mixing flow path 115, the flow paths 111, 112, 113, 114, 116, 117, 118, and 119, the measurement flow path 151, and the reference flow path 152 are grooves that are not open in the surface 1a or 1b.

Elements continuous with each other refer to the elements being connected to allow a fluid to flow through the elements. The flow path 111 is continuous with the entry hole 121 and the exit hole 127. The flow path 112 is continuous with the entry hole 128 and the exit hole 141. The flow path 113 is continuous with the entry hole 122 and the exit hole 125. The flow path 114 is continuous with the entry hole 126 and the exit hole 142.

The mixing flow path 115 is continuous with the mixing-fluid hole 123 and is between the mixing-fluid hole 123 and the flow path 117. The flow path 116 is between the flow path 117 and the reference flow path 152. The flow path 117 is continuous with the mixing flow path 115 and is between the measurement flow path 151 and the flow path 116. The flow path 118 is continuous with the entry hole 124 and is between the entry hole 124 and the reference flow path 152. The flow path 119 is continuous with the exit hole 143 and is between the exit hole 143 and the measurement flow path 151.

The measurement flow path 151 is between the flow path 117 and the flow path 119. The measurement flow path 151 extends in the Y direction. The measurement flow path 151 has the end in the Y direction continuous with the flow path 117 and the opposite end continuous with the flow path 119. The measurement flow path 151 includes a portion continuous with the flow path 117 in the area R2 as viewed in plan. The measurement flow path 151 is continuous with the entry hole 129.

The reference flow path 152 is between the flow path 116 and the flow path 118. The reference flow path 152 extends in the Y direction. The reference flow path 152 has the end in the Y direction continuous with the flow path 116 and the opposite end continuous with the flow path 118. In the present embodiment, the measurement flow path 151 and the reference flow path 152 both extend in the Y direction. However, the measurement flow path 151 and the reference flow path 152 may extend in different directions.

Figure 3A:
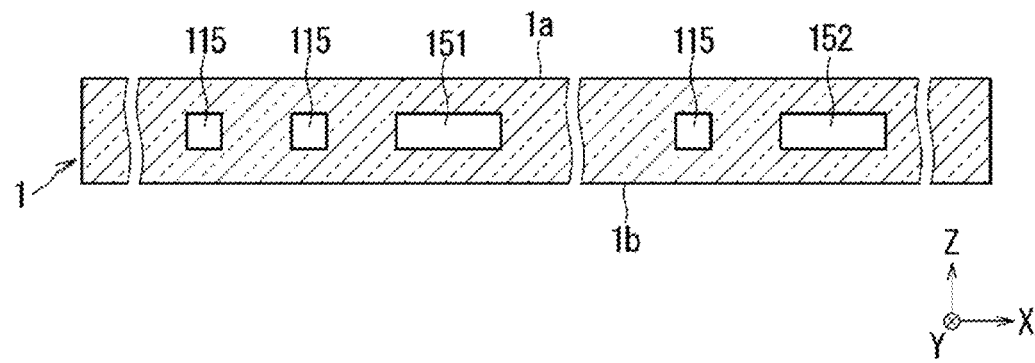
FIG. 3A is a schematic and partially cut imaginary sectional view of the flow path device at position A-A as viewed in the Y direction.

FIG. 3A is an imaginary sectional view of the flow path device 100. The mixing flow path 115 extends from the mixing-fluid hole 123 substantially in the Y direction, substantially in the −Y direction, substantially in the Y direction, and then in the −X direction, and is continuous with the flow path 117.

Figure 3B:
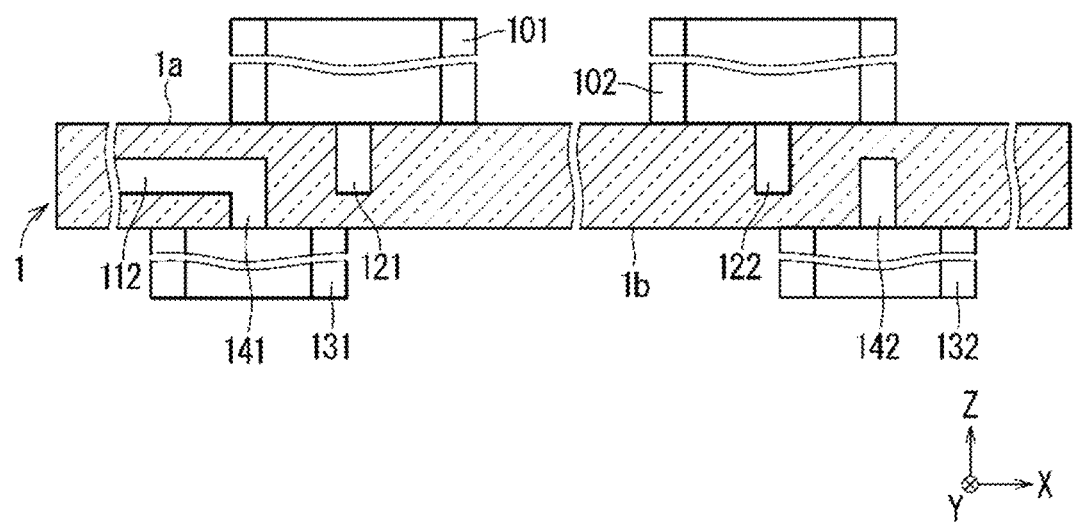
FIG. 3B is a schematic and partially cut imaginary sectional view of the flow path device at position B-B as viewed in the Y direction.
Figure 3C:
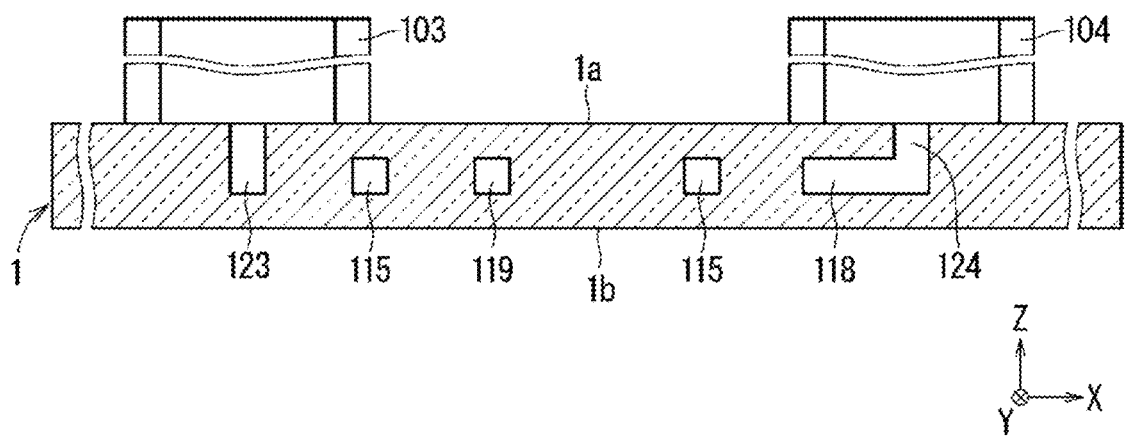
FIG. 3C is a schematic and partially cut imaginary sectional view of the flow path device at position E-E as viewed in the Y direction.

FIGS. 3B and 3C are imaginary sectional views of the flow path device 100. The processing device 1 includes cylinders 101, 102, 103, and 104 protruding from the surface 1a in the Z direction. The cylinder 101 surrounds the entry hole 121 about Z-axis. The cylinder 102 surrounds the entry hole 122 about Z-axis. The cylinder 103 surrounds the mixing-fluid hole 123 about Z-axis. The cylinder 104 surrounds the entry hole 124 about Z-axis.

The processing device 1 includes cylinders 131, 132, and 133 protruding from the surface 1b in the direction opposite to the Z direction. The cylinder 131 surrounds the exit hole 141 about Z-axis. The cylinder 132 surrounds the exit hole 142 about Z-axis. The cylinder 133 surrounds the exit hole 143 about Z-axis.

Figure 4:
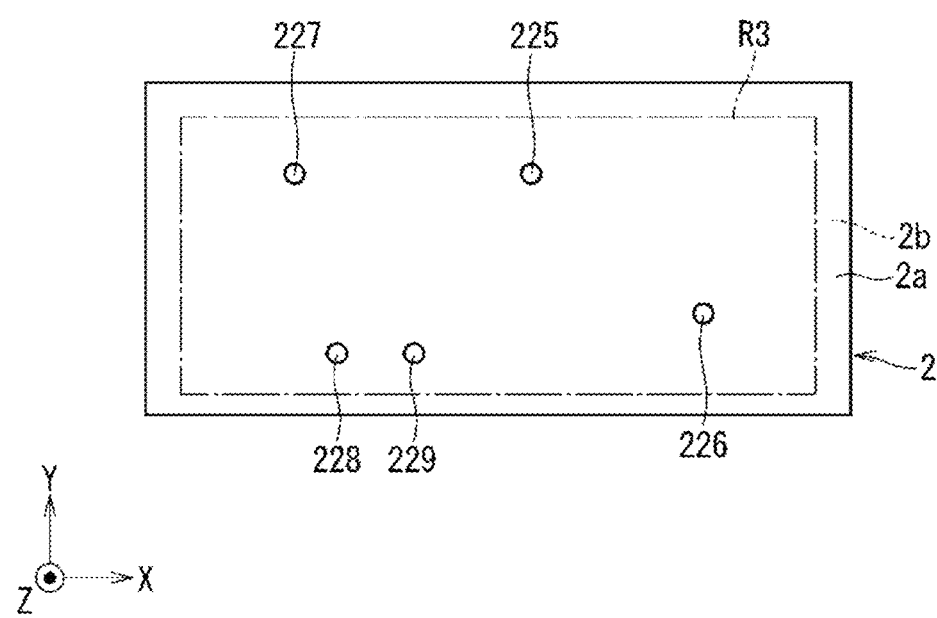
FIG. 4 is a schematic plan view of a connection device as viewed vertically downward.

FIG. 4 is a plan view of the connection device 2. An area R3 is an area at which the surface 3*b* is to be bonded. The connection device 2 includes through-holes 225, 226, 227, 228, and 229. The through-holes 225, 226, 227, 228, and 229 extend through and between the surface 2*a* and the surface 2*b* in the area R3.

Figure 5A:
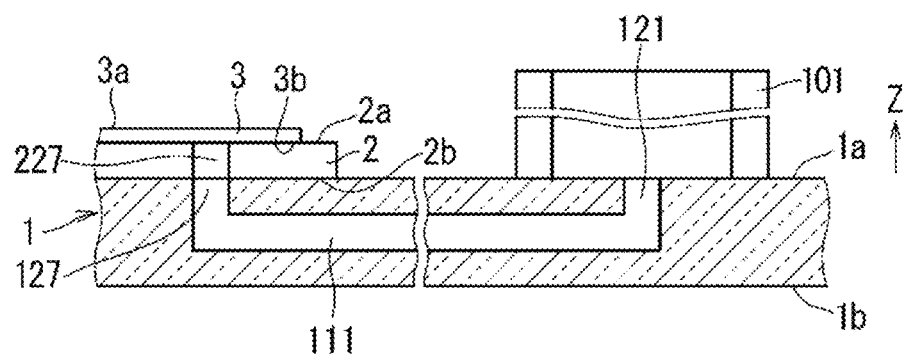
FIG. 5A is a schematic and partially cut imaginary sectional view of the flow path device at position C-C as viewed in a direction orthogonal to the Z direction.
Figure 5B:
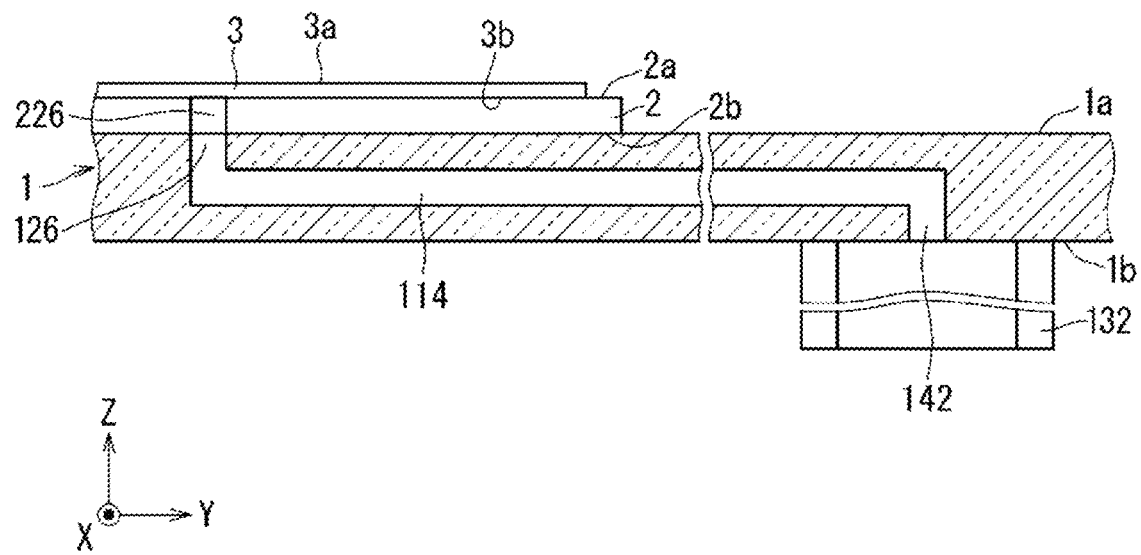
FIG. 5B is a schematic and partially cut imaginary sectional view of the flow path device at position D-D as viewed in the −X direction.
Figure 5C:
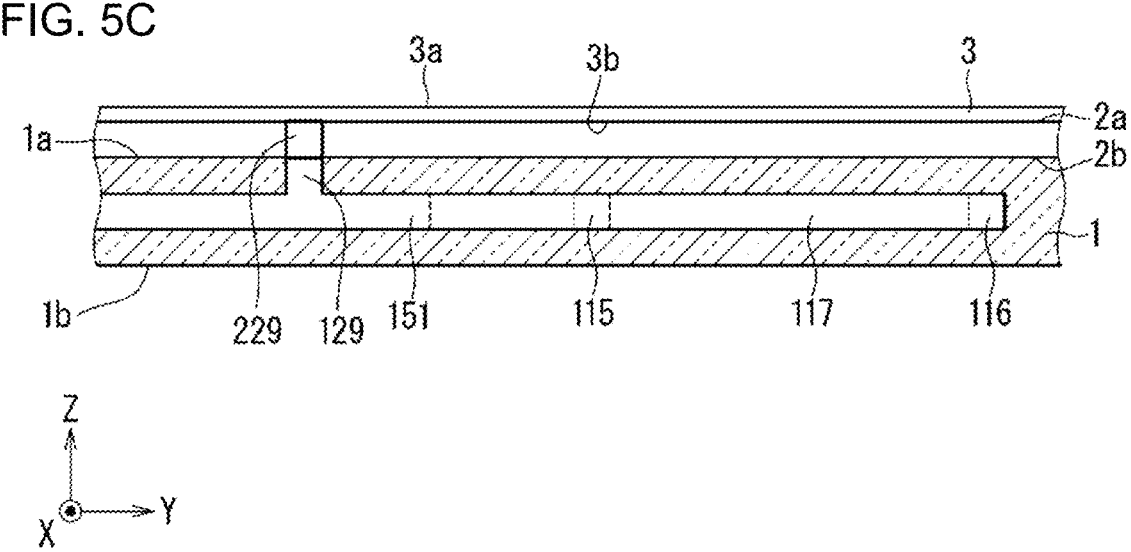
FIG. 5C is a schematic and partially cut imaginary sectional view of the flow path device at position F-F as viewed in the −X direction.

FIGS. 5A, 5B, and 5C are imaginary sectional views of the flow path device 100. The through-hole 225 is continuous with the exit hole 125. The through-hole 225 is continuous with the entry hole 122 through the exit hole 125 and the flow path 113 in this order. The through-hole 226 is continuous with the entry hole 126. The through-hole 226 is continuous with the exit hole 142 through the entry hole 126 and the flow path 114 in this order. The through-hole 227 is continuous with the exit hole 127. The through-hole 227 is continuous with the entry hole 121 through the exit hole 127 and the flow path 111 in this order. The through-hole 228 is continuous with the entry hole 128. The through-hole 228 is continuous with the exit hole 141 through the entry hole 128 and the flow path 112 in this order. The through-hole 229 is continuous with the entry hole 129. The through-hole 229 is continuous with the measurement flow path 151 through the entry hole 129.

Figure 6:
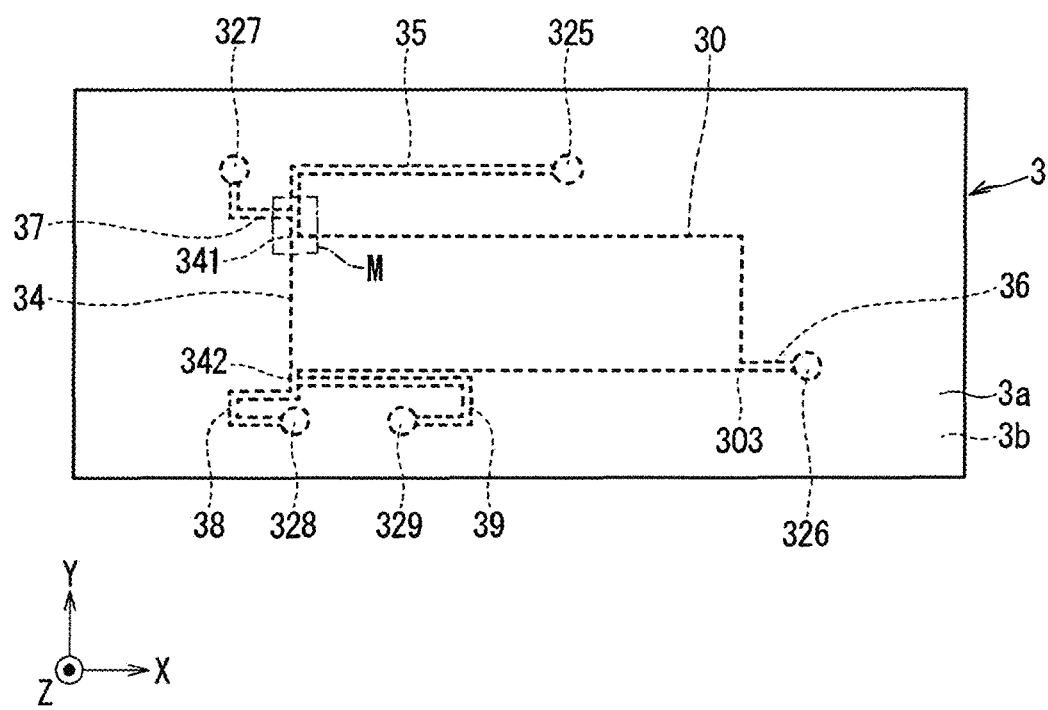
FIG. 6 is a schematic plan view of a separating device as viewed vertically downward (in the −Z direction).

FIG. 6 is a plan view of the separating device 3. The separating device 3 has a thickness (a dimension in the Z direction) of, for example, about 1 to 5 mm. The surfaces 3*a* and 3*b* each have a width (a dimension in the X direction) of, for example, about 10 to 50 mm. The surfaces 3*a* and 3*b* each have a length (a dimension in the Y direction) of, for example, about 10 to 30 mm.

The separating device 3 includes entry holes 325 and 327, exit holes 326, 328, and 329, a separating flow path 30, and flow paths 35, 37, 38, and 39. The entry holes 325 and 327 and the exit holes 326, 328, and 329 are open in the surface 3*b* without being open in the surface 3*a*. The separating flow path 30 and the flow paths 35, 37, 38, and 39 are grooves that are open in the surface 3*b* without being open in the surface 3*a*.

The surface 3*b* is in contact with the surface 2*a* excluding a portion with the entry holes 325 and 327, the exit holes 326, 328, and 329, the separating flow path 30, and the flow paths 35, 37, 38, and 39. A fluid does not enter between portions of the surface 3*b* and the surface 2*a* that are in contact with each other. The separating flow path 30 and the flow paths 35, 37, 38, and 39, together with the surface 2*a*, allow a fluid to move.

The separating flow path 30 includes a main flow path 34 and an output port 303. The main flow path 34 includes an input port 341 and an output port 342. The main flow path 34 extends in the –Y direction from the input port 341 to the output port 342.

Figure 7:
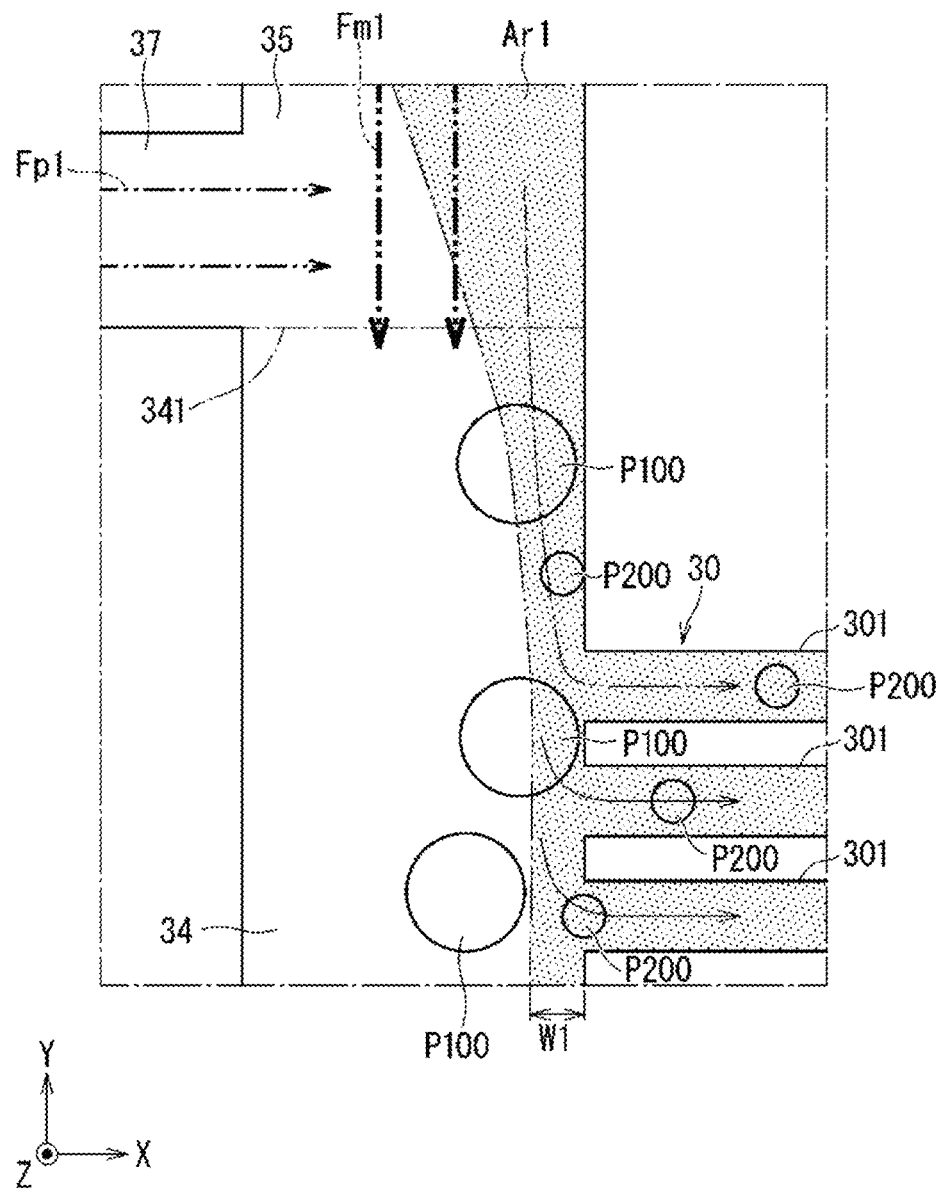
FIG. 7 is a plan view illustrating an area M in FIG. 6.

FIG. 7 partially illustrates the separating device 3. The separating flow path 30 and the flow paths 35 and 37 are illustrated with solid lines for convenience. The separating flow path 30 includes multiple branch flow paths 301. The branch flow paths 301 branch from the main flow path 34 at different positions in the Y direction. The branch flow paths 301 each extend in the X direction. The branch flow paths 301 are each continuous with the output port 303 opposite to the main flow path 34.

The entry hole 325 is continuous with the through-hole 225. The entry hole 325 is continuous with the entry hole 122 through the through-hole 225, the exit hole 125, and the flow path 113 in this order. The entry hole 327 is continuous with the through-hole 227. The entry hole 327 is continuous with the entry hole 121 through the through-hole 227, the exit hole 127, and the flow path 111 in this order. The exit hole 326 is continuous with the through-hole 226. The exit hole 326 is continuous with the exit hole 142 through the through-hole 226, the entry hole 126, and the flow path 114 in this order. The exit hole 328 is continuous with the through-hole 228. The exit hole 328 is continuous with the exit hole 141 through the through-hole 228, the entry hole 128, and the flow path 112 in this order. The exit hole 329 is continuous with the through-hole 229. The exit hole 329 is continuous with the measurement flow path 151 through the through-hole 229 and the entry hole 129.

The flow path 35 joins the entry hole 325 and the input port 341. The flow path 35 is continuous with the main flow path 34 at the input port 341. The flow path 35 extends in the –Y direction and is joined to the input port 341. The flow path 35 includes a portion extending in the Y direction near the input port 341.

The flow path 37 extends in the X direction and is joined to the portion of the flow path 35 extending in the Y direction near the input port 341. The entry hole 327 is continuous with the main flow path 34 through the flow path 37.

The flow path 36 joins the exit hole 326 and the output port 303. The flow path 36 extends in the X direction.

The flow path 38 joins the exit hole 328 and the output port 342. The flow path 38 extends in the Y direction and is joined to the output port 342. The flow path 38 extends from the output port 342 in the –Y direction, in the –X direction, in the –Y direction, and then in the X direction to the exit hole 328.

The flow path 39 extends in the –X direction and is joined to a portion of the flow path 38 extending in the Y direction near the output port 342. The exit hole 329 is continuous with the output port 342 through the flow path 39. The flow path 39 extends from the flow path 38 in the X direction, in the –Y direction, and then in the –X direction to the exit hole 329.

2. Example Functions

The flow path device 100 has functions generally described below.

A fluid containing multiple types of particles P100 and P200 (hereafter also a processing target fluid; refer to FIG. 7) is introduced into the separating device 3. The separating device 3 separates separating target particles P100 as a specific type of particles from other types of particles (hereafter also non-target particles) P200 and discharges the separating target particles P100. The fluid may contain three or more types of particles. In the example described below, the separating target particles P100 are of a single type, and the non-target particles P200 are of another single type.

The processing device 1 is used to perform a process on the separating target particles P100. The process includes, for example, counting the separating target particles P100 (detection of the number). To describe the process, the separating target particles P100 and the fluid containing the separating target particles P100 are both herein also referred to as a sample.

The connection device 2 guides the separating target particles P100 (specifically, the sample) discharged from the separating device 3 to the processing device 1.

A pressing fluid is introduced into the flow path device 100 through the entry hole 121. A processing target fluid is introduced into the flow path device 100 through the entry hole 122. A mixing fluid is fed into the flow path device 100 through the mixing-fluid hole 123. The mixing fluid is discharged from the flow path device 100 through the mixing-fluid hole 123. A dispersing fluid is introduced into the flow path device 100 through the entry hole 124. Specific examples and the functions of the pressing fluid, the mixing fluid, and the dispersing fluid are described later.

A tube is externally connectable to the flow path device 100 to introduce the pressing fluid into the flow path device 100 through the entry hole 121 using the cylinder 101.

A tube is externally connectable to the flow path device 100 to introduce the processing target fluid into the flow path device 100 through the entry hole 122 using the cylinder 102.

A tube is externally connectable to the flow path device 100 to feed the mixing fluid into the flow path device 100 through the mixing-fluid hole 123 using the cylinder 103.

A tube is externally connectable to the flow path device 100 to introduce the dispersing fluid into the flow path device 100 through the entry hole 124 using the cylinder 104.

The processing target fluid introduced into the flow path device 100 through the entry hole 122 flows through the flow path 113, the exit hole 125, the through-hole 225, the entry hole 325, the flow path 35, and the input port 341 in this order, and then flows into the main flow path 34.

The pressing fluid introduced into the flow path device 100 through the entry hole 121 flows through the flow path 111, the exit hole 127, the through-hole 227, the entry hole 327, and the flow path 37 in this order, and then flows into the main flow path 34.

In FIG. 7, the arrows Fp1 drawn with two-dot chain lines indicate the direction of flow of the pressing fluid. The direction is the X direction. In FIG. 7, the arrows Fm1 drawn with two-dot chain lines thicker than the arrows Fp1 indicate the direction of the main flow of the processing target fluid (also referred to as a main flow) in the main flow path 34. The direction is the −Y direction.

FIG. 7 schematically illustrates the separating target particles P100 with a greater diameter than the non-target particles P200 being separated from the non-target particles P200. More specifically, in the illustrated example, the branch flow paths 301 each have a width (a dimension of the branch flow path 301 in the Y direction) greater than the diameter of the non-target particles P200 and less than the diameter of the separating target particles P100.

At least the main flow path 34 and the flow path 35 each have a width greater than the diameter of the separating target particles P100 and the diameter of the non-target particles P200. The width of the main flow path 34 refers to the dimension of the main flow path 34 in the X direction. The width of the flow path 35 refers to the dimension of the flow path 35 in the X direction for its portion near the main flow path 34. The width of the flow path 35 refers to the dimension of the flow path 35 in the Y direction for its portion extending in the −X direction.

The non-target particles P200 move along the main flow path 34 in the −Y direction and mostly flow into the branch flow paths 301. The non-target particles P200 mostly flow through the branch flow paths 301, the output port 303, the flow path 36, the exit hole 326, the through-hole 226, the entry hole 126, and the flow path 114, and are then discharged through the exit hole 142.

The branch flow paths 301 connected to the main flow path 34 each have the cross-sectional area and the length adjusted to cause the non-target particles P200 to flow from the main flow path 34 into the branch flow paths 301 and to be separated from the separating target particles P100. In the present embodiment, a process to be performed on the discharged non-target particles P200 is not specified.

The separating target particles P100 move along the main flow path 34 in the −Y direction substantially without flowing into the branch flow paths 301. The separating target particles P100 mostly flow through the main flow path 34, the output port 342, the flow path 39, the exit hole 329, the through-hole 229, and the entry hole 129 into the measurement flow path 151.

While the separating target particles P100 flow through the flow path 39, a component of the processing target fluid other than the separating target particles P100 flows through the flow path 38 and is discharged. An example of the component is described later. The flow path 39 has a width greater than the size of the separating target particles P100. The separating target particles P100 flow from the output port 342 into the flow path 39 rather than into the flow path 38, similarly to the non-target particles P200 flowing into the branch flow paths 301 from the main flow path 34.

The component flows into the flow path 38, further flows through the exit hole 328, the through-hole 228, the entry hole 128, and the flow path 112, and is then discharged through the exit hole 141. In the present embodiment, a process to be performed on the discharged component is not specified.

In the present embodiment, the processing target fluid is directed into the branch flow paths 301 using a flow (hereafter, a fluid-drawing flow). The fluid-drawing flow allows the separating target particles P100 to be separated from the non-target particles P200 using the main flow path 34 and the branch flow paths 301. The fluid-drawing flow is indicated by a hatched area Ar1 with a dot pattern in FIG. 7. The state of the fluid-drawing flow indicated by the area Ar1 in FIG. 7 is a mere example and may be changed in accordance with the relationship between the flow velocity and the flow rate of the introduced processing target fluid (main flow) and the flow velocity and the flow rate of the pressing fluid. The area Ar1 may be adjusted as appropriate to efficiently separate the separating target particles P100 from the non-target particles P200.

The pressing fluid directs the processing target fluid toward the branch flow paths 301 in the X direction from a position opposite to the branch flow paths 301. The pressing fluid can create the fluid-drawing flow.

In FIG. 7, the fluid-drawing flow in the main flow path 34 has a width W1 (a dimension of the fluid-drawing flow in the X direction) near a branch of the main flow path 34 to each branch flow path 301. The width W1 may be adjusted by, for example, the cross-sectional areas and the lengths of the main flow path 34 and the branch flow paths 301 and by the flow rates of the processing target fluid and the pressing fluid.

At the width W1 illustrated in FIG. 7, the area Ar1 of the fluid-drawing flow does not include the center of gravity of each separating target particle P100 and includes the center of gravity of each non-target particle P200.

The processing target fluid is, for example, blood. In this case, the separating target particles P100 are, for example, white blood cells. The non-target particles P200 are, for example, red blood cells. The process on the separating target particles P100 includes, for example, counting white blood cells. The component flowing through the flow path 38 and the exit hole 328 before being discharged from the separating device 3 is, for example, blood plasma. In this case, the pressing fluid is, for example, PBS (phosphate-buffered saline).

A red blood cell has the center of gravity at, for example, about 2 to 2.5 μm (micrometers) from its outer rim. A red blood cell has a maximum diameter of, for example, about 6 to 8 μm. A white blood cell has the center of gravity at, for example, about 5 to 10 μm from its outer rim. A white blood cell has a maximum diameter of, for example, about 10 to 30 µm. To effectively separate red blood cells and white blood cells in blood, the fluid-drawing flow has the width W1 of about 2 to 15 µm.

The main flow path 34 has an imaginary cross-sectional area of, for example, about 300 to 1000 µm² (square micrometers) along the XZ plane. The main flow path 34 has a length of, for example, about 0.5 to 20 mm in the Y direction. Each branch flow path 301 has an imaginary cross-sectional area of, for example, about 100 to 500 µm² along the YZ plane. Each branch flow path 301 has a length of, for example, about 3 to 25 mm in the X direction. The flow velocity in the main flow path 34 is, for example, about 0.2 to 5 m/s (meters per second). The flow rate in the main flow path 34 is, for example, about 0.1 to 5 µl/s (microliters per second).

The material for the separating device 3 is, for example, PDMS (polydimethylsiloxane). PDMS is highly transferable in resin molding using molds. A transferrable material can produce a resin-molded product including fine protrusions and recesses corresponding to a fine pattern on the mold. The separating device 3 is resin-molded using PDMS for easy manufacture of the flow path device 100. The material for the connection device 2 is, for example, a silicone resin.

The dispersing fluid introduced into the flow path device 100 through the entry hole 124 flows through the flow path 118, the reference flow path 152, and the flow paths 116 and 117 in this order, and then flows into the measurement flow path 151.

The dispersing fluid disperses the separating target particles P100 introduced into the measurement flow path 151 through the entry hole 129. Dispersing herein is an antonym of clumping or aggregation of the separating target particles P100. Dispersing the separating target particles P100 allows a predetermined process (e.g., counting in the present embodiment) to be performed easily or accurately or both. For the processing target fluid being blood, the dispersing fluid is, for example, PBS.

The mixing fluid introduced into the flow path device 100 through the mixing-fluid hole 123 flows into the mixing flow path 115. The mixing fluid flows back and forth through the mixing flow path 115 with an external operation. For example, the mixing fluid may be air. In this case, the air pressure at the mixing-fluid hole 123 is controlled to cause air to flow back and forth through the mixing flow path 115. For example, the mixing fluid may be PBS. In this case, PBS flows back and forth through the mixing flow path 115 as it flows into and out of the mixing-fluid hole 123.

The mixing fluid flowing back and forth through the mixing flow path 115 allows mixing of the dispersing fluid and the sample. The dispersing fluid being mixed with the sample can disperse the separating target particles P100.

The sample, the dispersing fluid, and optionally the mixing fluid, flow through the measurement flow path 151 toward the flow path 119. The measurement flow path 151 is used to perform a predetermined process on the separating target particles P100.

In the illustrated example, the predetermined process includes counting the separating target particles P100. The separating target particles P100 in the measurement flow path 151 can be counted with known optical measurement. For example, the separating target particles P100 are counted by using illumination of the surface 1b with light that is transmitted through the processing device 1 to the surface 1a and measuring the transmitted light at the measurement flow path 151.

The processing device 1 may be light-transmissive for efficient counting of the separating target particles P100. In FIGS. 1, 3A, 3B, 3C, 5A, 5B, 5C, and 9, the processing device 1 is hatched to indicate its light transmissiveness.

The same or similar optical measurement is performed on, for example, the reference flow path 152. The measurement result may be used as a reference value for counting at the measurement flow path 151. The reference value can reduce counting error.

The sample, the dispersing fluid, and optionally the mixing fluid, flow through the flow path 119 and are discharged through the exit hole 143 after the predetermined process is performed on the separating target particles P100. In the present embodiment, a process to be performed on the discharged separating target particles P100 is not specified.

The material for the processing device 1 is, for example, a COP (cycloolefin polymer). The device made of a COP is highly light-transmissive and less flexible.

With the separating flow path 30 and the flow paths 35, 37, 38, and 39, together with the surface 2a, allowing a fluid to move, the connection device 2 and the separating device 3 are less flexible. The separating device 3 made of PDMS and the connection device 2 made of a silicone resin are flexible. The processing device 1 made of a COP is less likely to deteriorate the function of the separating device 3.

3. Fluid Movement from Exit Hole 329 to Through-Hole 229

Figure 8:
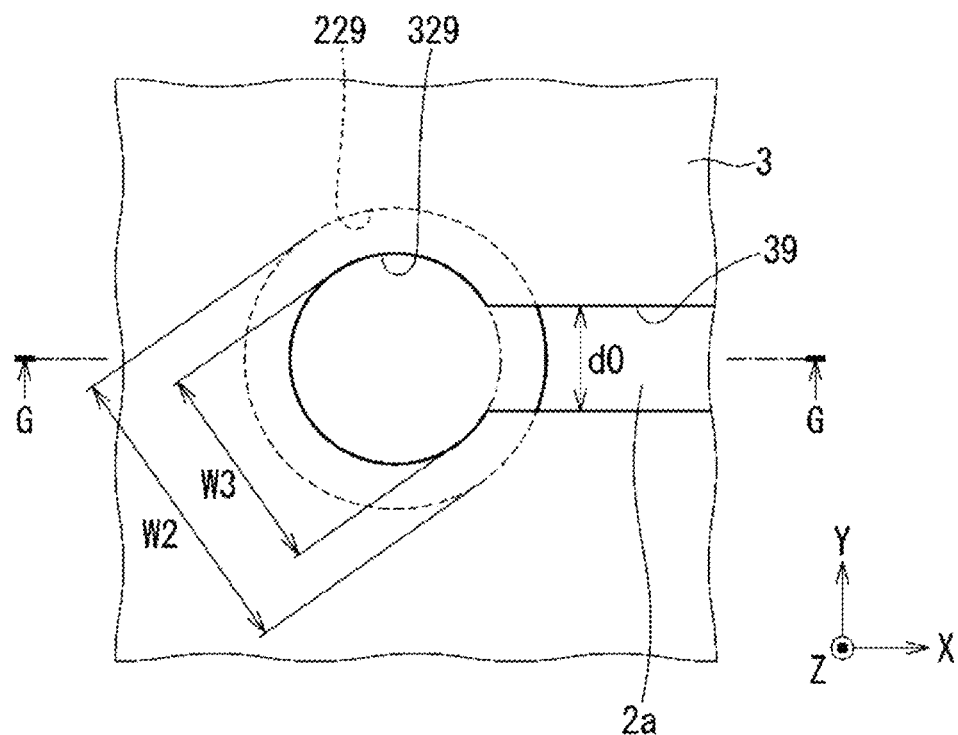
FIG. 8 is a schematic and partially cut sectional view of the connection device and the separating device at position H-H in FIG. 9 as viewed vertically downward (in the −Z direction).

The structure will now be described with reference to FIGS. 2, 5C, 8, and 9. For simplicity, the through-hole 229 and the exit hole 329 each may have a circular edge as viewed in plan (hereafter simply an edge). The through-hole 229 has an edge defined by the rim of the opening in the surface 2a. The exit hole 329 has an edge defined by the rim of the opening in the separating device 3 as viewed in plan. The same applies to FIG. 8. In FIG. 8, the boundary between the exit hole 329 and the flow path 39 is indicated by an arc drawn with an imaginary dot-dash line.

A fluid moves from the flow path 39 through the exit hole 329, the through-hole 229, and the entry hole 129 before reaching the measurement flow path 151. The fluid moves from the flow path 39 in the −X direction on the surface 2a before reaching the exit hole 329.

The through-hole 229 typically has an edge surrounding the edge of the exit hole 329 as viewed in plan. The through-hole 229 and the exit hole 329 located in this manner allow the fluid to easily move from the exit hole 329 to the through-hole 229 with any misalignment of these holes. For this layout, the through-hole 229 has an edge with a diameter W2 greater than a diameter W3 of the edge of the exit hole 329.

The entry hole 129 herein may have any size. For example, the entry hole 129 may be aligned with the through-hole 229 as viewed in plan. The same applies to FIG. 9. The diameter W2 is greater than or equal to the diameter W3. For example, the diameter W2 is 2.4 mm. For example, the diameter W3 is 2.0 mm.

The diameter W3 is greater than a width d0 of the flow path 39 near the exit hole 329 (a dimension of the flow path 39 in the Y direction in the portion extending in the −X direction toward the exit hole 329). The flow path 39 and the exit hole 329 with such sizes facilitate movement of the fluid from the flow path 39 to the exit hole 329. For example, the width d0 is 0.9 mm.

For example, a fluid is introduced into the flow path device 100 through the entry hole 121 in a process before the processing target fluid is introduced into the flow path device 100. Such a fluid (hereafter, a preprocessing fluid) facilitates movement of the processing target fluid and the sample in the separating device 3.

The preprocessing fluid is introduced through the entry hole 327. For example, the preprocessing fluid also serves as the pressing fluid and flows through the entry hole 121, the flow path 111, the exit hole 127, the through-hole 227, and the entry hole 327 in this order and reaches the flow path 37.

The preprocessing fluid flows from the flow path 37 through the flow path 35 to at least the entry hole 325, or further flows through the through-hole 225, the exit hole 125, and the flow path 113 in this order, and is then discharged through the entry hole 122. The preprocessing fluid flows through the flow path 35 and the entry hole 325 or further through the through-hole 225, the exit hole 125, the flow path 113, and the entry hole 122 in the direction opposite to the direction of the processing target fluid.

The preprocessing fluid flows from the flow path 37 through the main flow path 34 and the flow path 38 to at least the exit hole 328, or further flows through the through-hole 228, the entry hole 128, and the flow path 112 in this order, and is then discharged through the exit hole 141.

The preprocessing fluid flows from the flow path 37 through the main flow path 34 and the flow path 39 to at least the exit hole 329, or further flows through the through-hole 229 and the entry hole 129 to the measurement flow path 151.

The preprocessing fluid flows from the flow path 37 through the main flow path 34, the branch flow paths 301, and the flow path 36 in this order to at least the exit hole 326, or further flows through the through-hole 226, the entry hole 126, and the flow path 114 in this order, and is then discharged through the exit hole 142.

Figure 9:
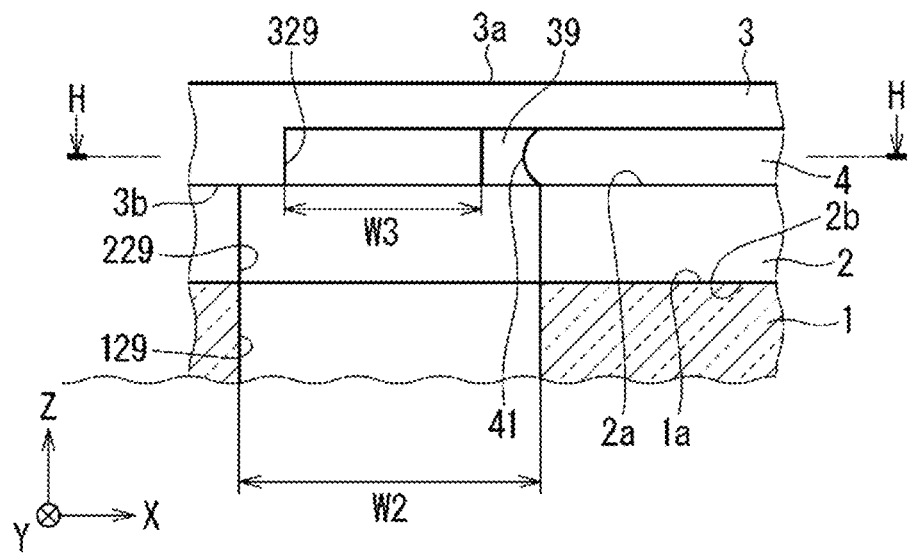
FIG. 9 is a schematic and partially cut imaginary sectional view of the connection device and the separating device at position G-G in FIG. 8 as viewed in the Y direction.

FIG. 9 illustrates a fluid 4 that does not reach the exit hole 329 and thus does not reach the through-hole 229. The fluid 4 has a surface 41 out of contact from the connection device 2 and the separating device 3 and protruding from the flow path 39 into the exit hole 329 at the edge of the through-hole 229.

The fluid 4 can have the surface 41 that is more likely to protrude when the fluid 4 is a hydrophilic liquid and the surface 2a is water repellent. In this case, the fluid 4 and the surface 2a define a greater contact angle. Under a constant pressure on the fluid 4, the contact angle has a cosine inversely proportional to the surface tension (refer to, for example, Laplace's equation). The surface tension increases as the contact angle increases. The fluid 4 with an increased surface tension moves less smoothly from the flow path 39 into the exit hole 329.

The preprocessing fluid is, for example, saline (e.g., PBS), which is hydrophilic. For the connection device 2 made of a silicone resin, the preprocessing fluid is less likely to reach the through-hole 229 similarly to the fluid 4.

As described above, for example, the surface 2a may be bonded to the surface 3b with plasma or light. This causes the surface 2a to be hydrophilic. After being bonded with plasma or light, the surface 2a becomes less hydrophilic over time. The preprocessing fluid is to smoothly move from the exit hole 329 to the through-hole 229 over a long time after the connection device 2 is bonded to the separating device 3.

The flow path 39 may have a fixed width d0 and a fixed cross-sectional area (the area of the section orthogonal to the X direction). In this case, the edge of the through-hole 229 may include a longer portion (hereafter, a contact portion) that comes in contact with the fluid 4 (refer to FIG. 9) flowing through the flow path 39 and the exit hole 329 toward the through-hole 229. The longer contact portion reduces the velocity head of preprocessing fluid moving from the exit hole 329 to the through-hole 229. The reduced velocity head causes the pressure head to increase (refer to, for example, Bernoulli's theorem). As the pressure head increases, the fluid 4 can flow more easily from the flow path 39 toward the exit hole 329.

FIGS. 10 to 20 each illustrate an edge 39c of the flow path 39, an edge 329c of the exit hole 329, and an edge 229c of the through-hole 229.

FIGS. 10 to 20 each illustrate the edge 329c as a circle around a point 329d with a dot-dash line indicating an imaginary line 329x through the point 329d and parallel to the X direction and a dot-dash line indicating an imaginary line 329y through the point 329d and parallel to the Y direction.

FIGS. 10 to 20 each illustrate the edge 229c as a circle around a point 229d with a dot-dash line indicating an imaginary line 229x through the point 229d and parallel to the X direction and a dot-dash line indicating an imaginary line 229y through the point 229d and parallel to the Y direction.

In each of FIGS. 10 to 20, the edge 39c and the edge 329c intersect with each other at two intersections Q1 and Q2.

FIGS. 10 to 13, with reference to FIG. 8, illustrate structures as viewed in plan with the features (i) and (ii) below. (i) The diameter W3 (that is also the diameter of the edge 329c) is greater than the dimension d0 of the flow path 39 in the Y direction orthogonal to the X direction in which the flow path 39 extends. (ii) The diameter W2 (that is also the diameter of edge 229c) is greater than the diameter W3.

FIGS. 10 to 13, with reference to FIG. 8, illustrate the exit hole 329, the through-hole 229, and the flow path 39 as viewed in plan with the features (iii) and (iv-1) below. (iii) The exit hole 329 has its center (illustrated as the point 329d) surrounded by the through-hole 229 (or in other words, surrounded by the edge 229c). (iv-1) The flow path 39 intersects with the exit hole 329 at two or more intersections (illustrated as the two intersections Q1 and Q2).

FIGS. 10 to 13 illustrate the exit hole 329, the through-hole 229, and the flow path 39 as viewed in plan with the feature (v-1) below. (v-1) The flow path 39 intersects with the exit hole 329 at intersections (illustrated as the two intersections Q1 and Q2) all located inward from the through-hole 229 (or in other words, located inward from the edge 229c).

The example of FIG. 10 will now be described. The imaginary line 229x is aligned with the imaginary line 329x. The imaginary line 229y is located in the X direction from the imaginary line 329y. The edge 229c intersects with the edge 329c at points P19 and P20. The edge 229c intersects with the edge 39c at points P21 and P22. The contact portion is an arc of the edge 229c defined by the points P21 and P22 and located in the X direction.

The example of FIG. 11 will now be described. The imaginary line 229x is aligned with the imaginary line 329x. The imaginary line 329y is located in the X direction from the imaginary line 229y. The edge 229c intersects with the edge 329c at points P23 and P24. The point P23 is at the same position as the intersection Q1. The point P24 is at the same position as the intersection Q2. The contact portion is an arc of the edge 229c defined by the points P23 and P24 and located in the X direction as viewed in plan.

Figure 10:
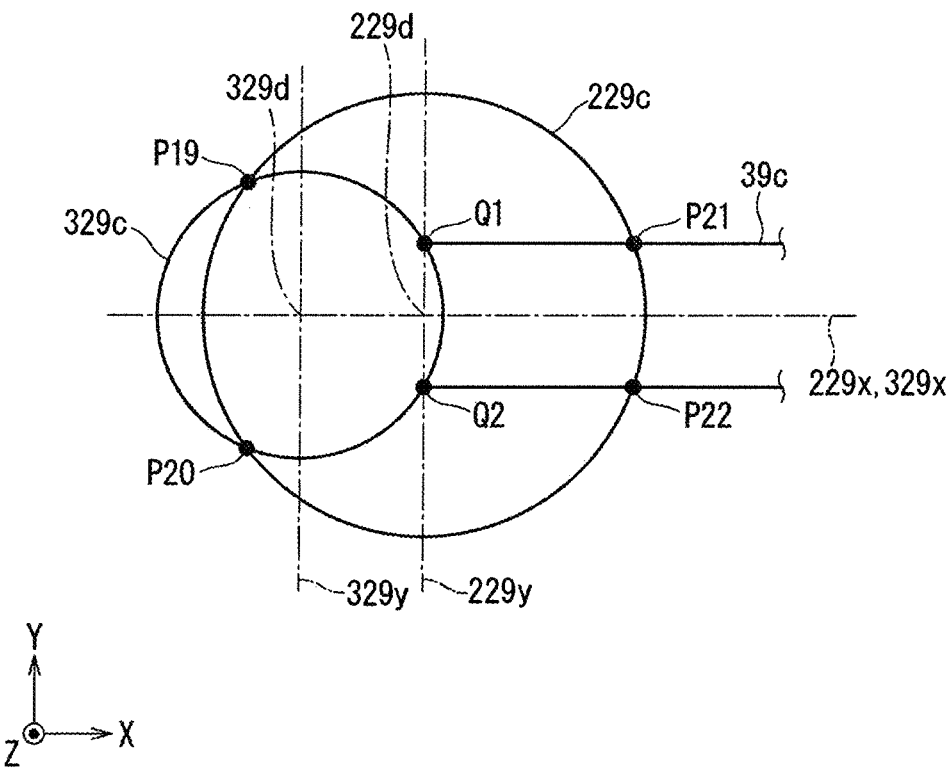
FIG. 10 is a schematic plan view of an exit hole, a flow path, and a through-hole illustrating the positional relationship between their edges as viewed vertically downward (in the −Z direction).
Figure 11:
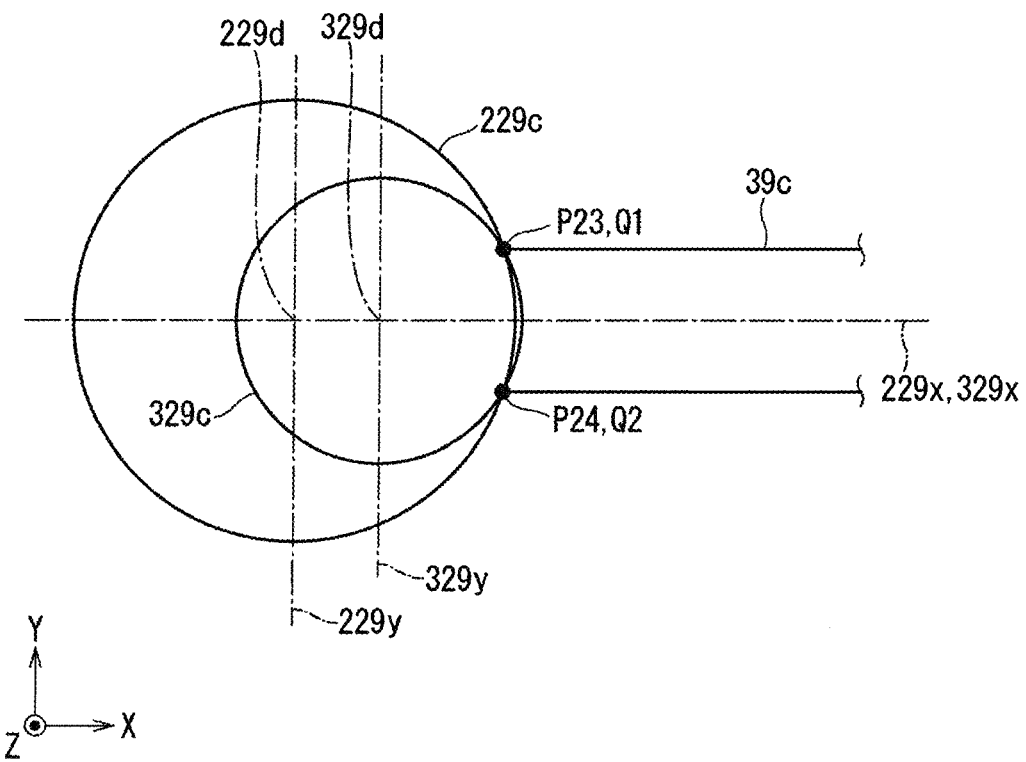
FIG. 11 is a schematic plan view of the exit hole, the flow path, and the through-hole illustrating the positional relationship between their edges as viewed vertically downward (in the −Z direction).

For the through-hole 229 and the exit hole 329 in the positional relationship illustrated in FIG. 8 as well, the arc corresponding to the arcs illustrated in FIGS. 10 and 11 is the contact portion.

Figure 12:
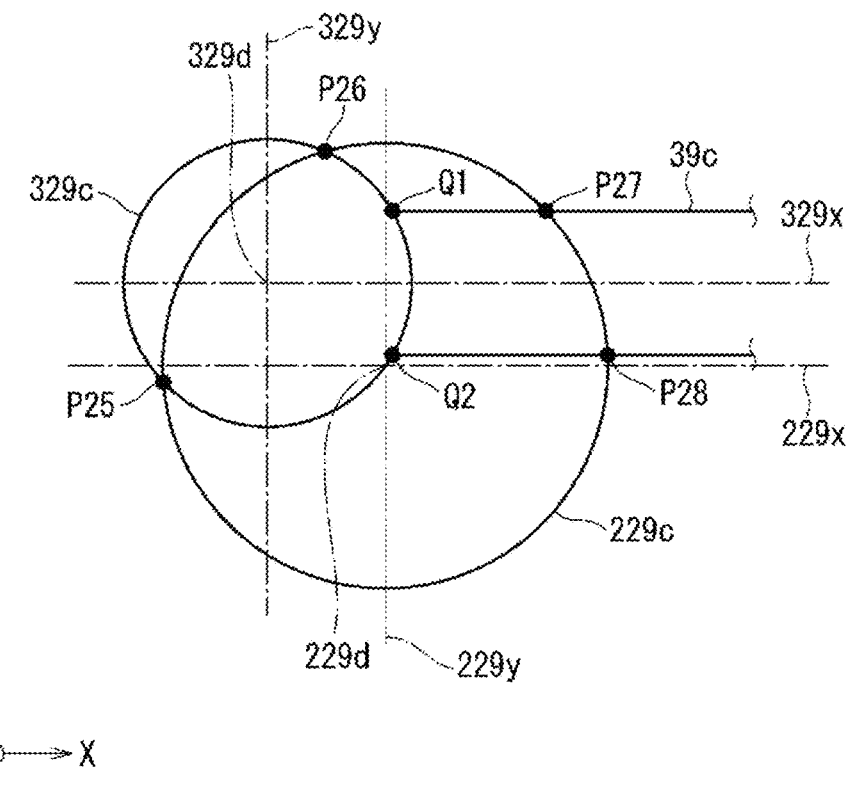
FIG. 12 is a schematic plan view of the exit hole, the flow path, and the through-hole illustrating the positional relationship between their edges as viewed vertically downward (in the −Z direction).

The example of FIG. 12 will now be described. The imaginary line 329x is located in the Y direction from the imaginary line 229x. The imaginary line 229y is located in the X direction from the imaginary line 329y. The edge 229c intersects with the edge 329c at points P25 and P26. The edge 229c intersects with the edge 39c at points P27 and P28. The contact portion is an arc of the edge 229c defined by the points P27 and P28 and excluding the points P25 and P26 as viewed in plan.

Figure 13:
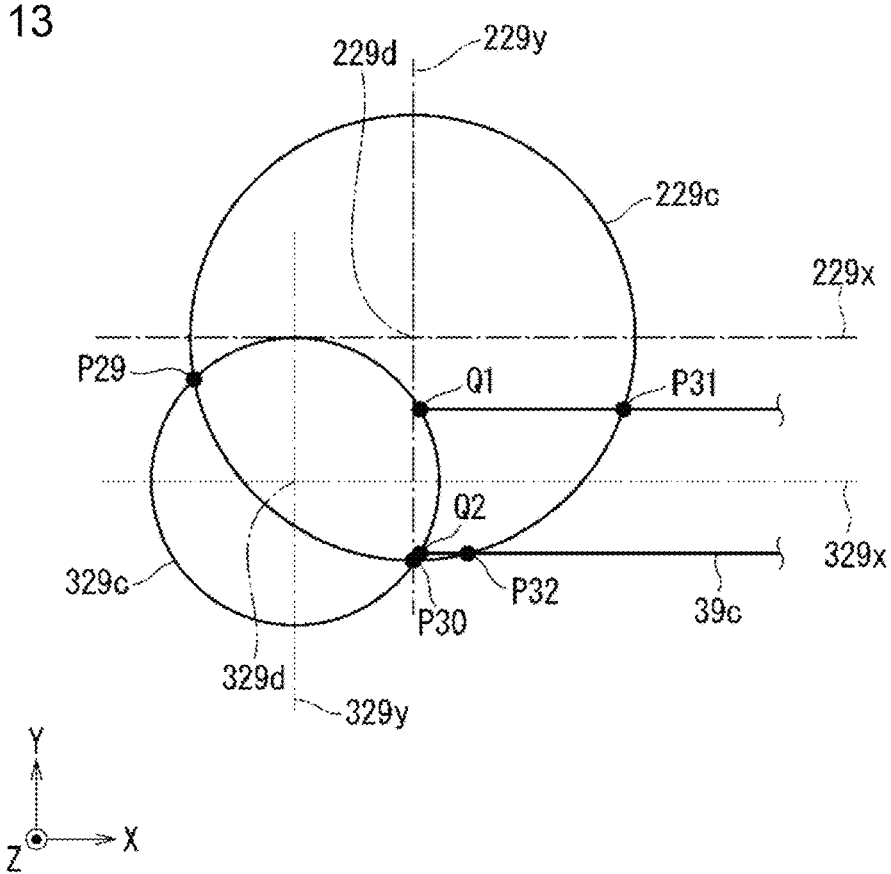
FIG. 13 is a schematic plan view of the exit hole, the flow path, and the through-hole illustrating the positional relationship between their edges as viewed vertically downward (in the −Z direction).

The example of FIG. 13 will now be described. The imaginary line 229x is located in the Y direction from the imaginary line 329x. The imaginary line 229y is located in the X direction from the imaginary line 329y. The edge 229c intersects with the edge 329c at points P29 and P30. The edge 229c intersects with the edge 39c at points P31 and P32. The contact portion is an arc of the edge 229c defined by the points P31 and P32 and excluding the points P29 and P30 as viewed in plan.

As illustrated in FIGS. 10 to 13, the device with the features (iii) and (iv-1) or with the feature (v-1) includes the contact portion surrounded by the edge 39c but not surrounded by the edge 329c. Such a device cannot easily include a long contact portion.

FIGS. 14 to 20, with reference to FIG. 8, illustrate the exit hole 329, the through-hole 229, and the flow path 39 as viewed in plan with the features (iii) and (iv-2) below. (iii) The exit hole 329 has its center (illustrated as the point 329d) surrounded by the through-hole 229 (or in other words, surrounded by the edge 229c). (iv-2) The flow path 39 intersects with the through-hole 229 at not more than one point or does not intersect with the through-hole 229.

FIGS. 14 to 20 illustrate the exit hole 329, the through-hole 229, and the flow path 39 as viewed in plan with the feature (v-2) below. (v-2) The flow path 39 intersects with the exit hole 329 at intersections (illustrated as the two intersections Q1 and Q2), and at least one of the intersections is located outward from the through-hole 229 (or in other words, located outward from the edge 229c).

Figure 14:
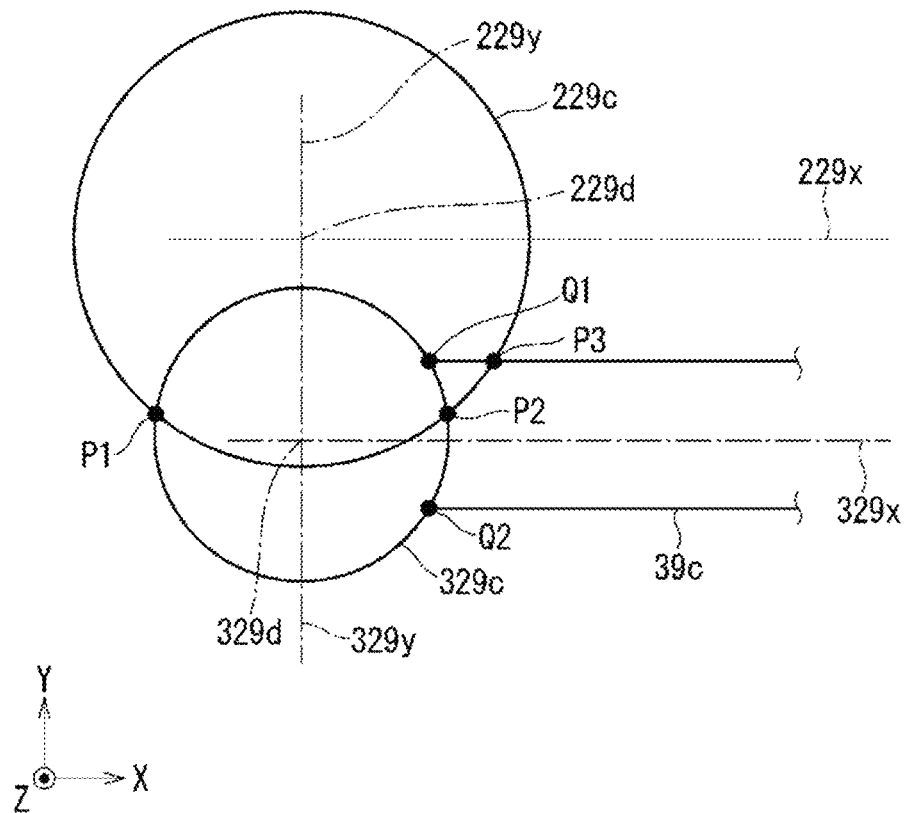
FIG. 14 is a schematic plan view of the exit hole, the flow path, and the through-hole illustrating the positional relationship between their edges as viewed vertically downward (in the −Z direction).

The example of FIG. 14 will now be described. The imaginary line 229y is aligned with the imaginary line 329y. The imaginary line 229x is located in the Y direction from the imaginary line 329x. The edge 229c intersects with the edge 329c at points P1 and P2. The edge 229c intersects with the edge 39c at a point P3. The contact portion is an arc of the edge 229c defined by the points P1 and P3 and passing through the point P2 as viewed in plan.

Figure 15:
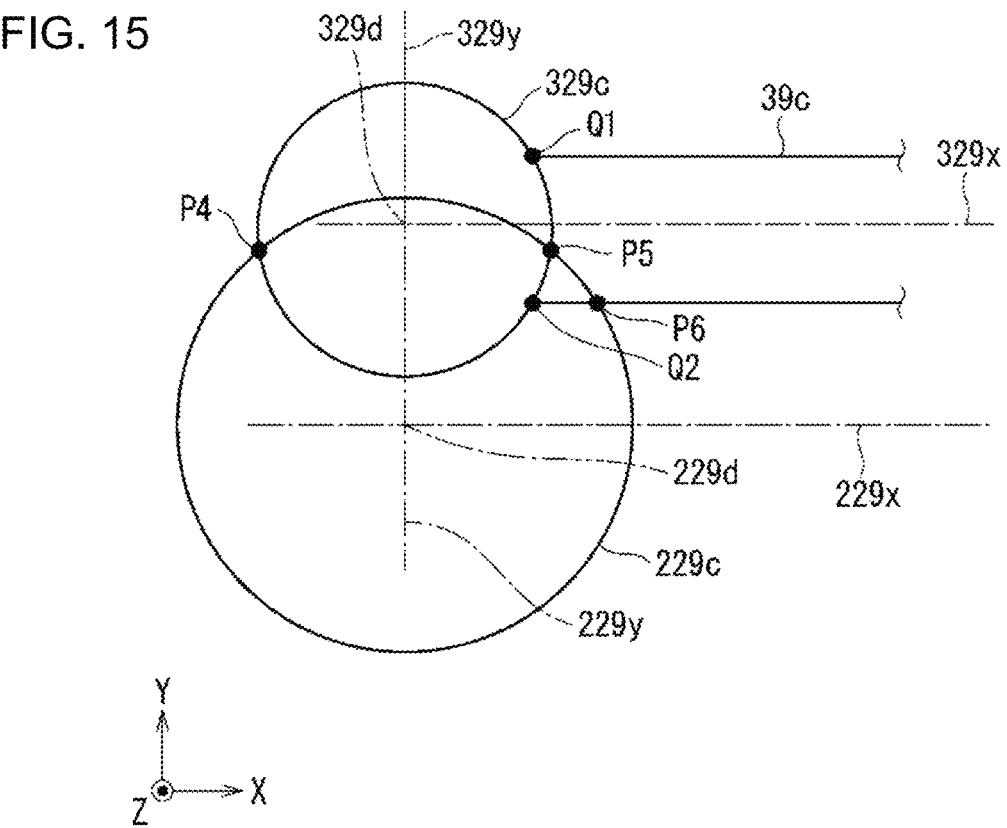
FIG. 15 is a schematic plan view of the exit hole, the flow path, and the through-hole illustrating the positional relationship between their edges as viewed vertically downward (in the −Z direction).

The example of FIG. 15 will now be described. The imaginary line 229y is aligned with the imaginary line 329y. The imaginary line 329x is located in the Y direction from the imaginary line 229x. The edge 229c intersects with the edge 329c at points P4 and P5. The edge 229c intersects with the edge 39c at a point P6. The contact portion is an arc of the edge 229c defined by the points P4 and P6 and passing through the point P5 as viewed in plan.

Figure 16:
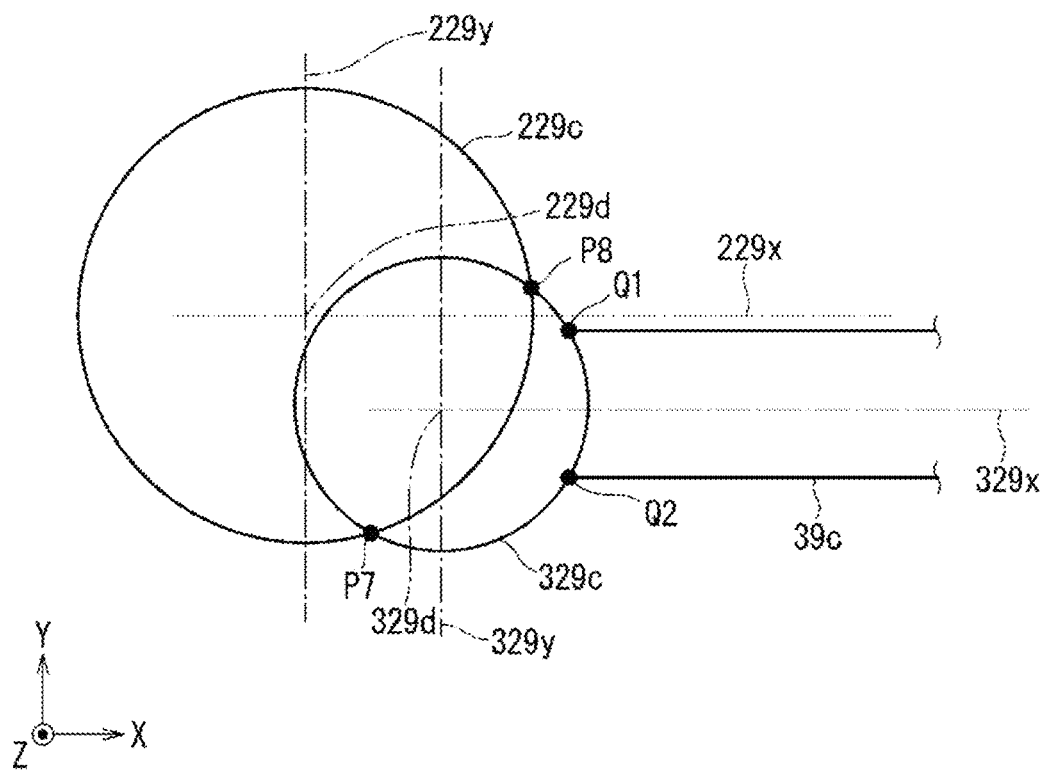
FIG. 16 is a schematic plan view of the exit hole, the flow path, and the through-hole illustrating the positional relationship between their edges as viewed vertically downward (in the −Z direction).

The example of FIG. 16 will now be described. The imaginary line 229x is located in the Y direction from the imaginary line 329x. The imaginary line 329y is located in the X direction from the imaginary line 229y. The edge 229c intersects with the edge 329c at points P7 and P8. The edge 229c does not intersect with the edge 39c. The contact portion is an arc of the edge 229c defined by the points P7 and P8 and nearer the intersections Q1 and Q2 as viewed in plan.

Figure 17:
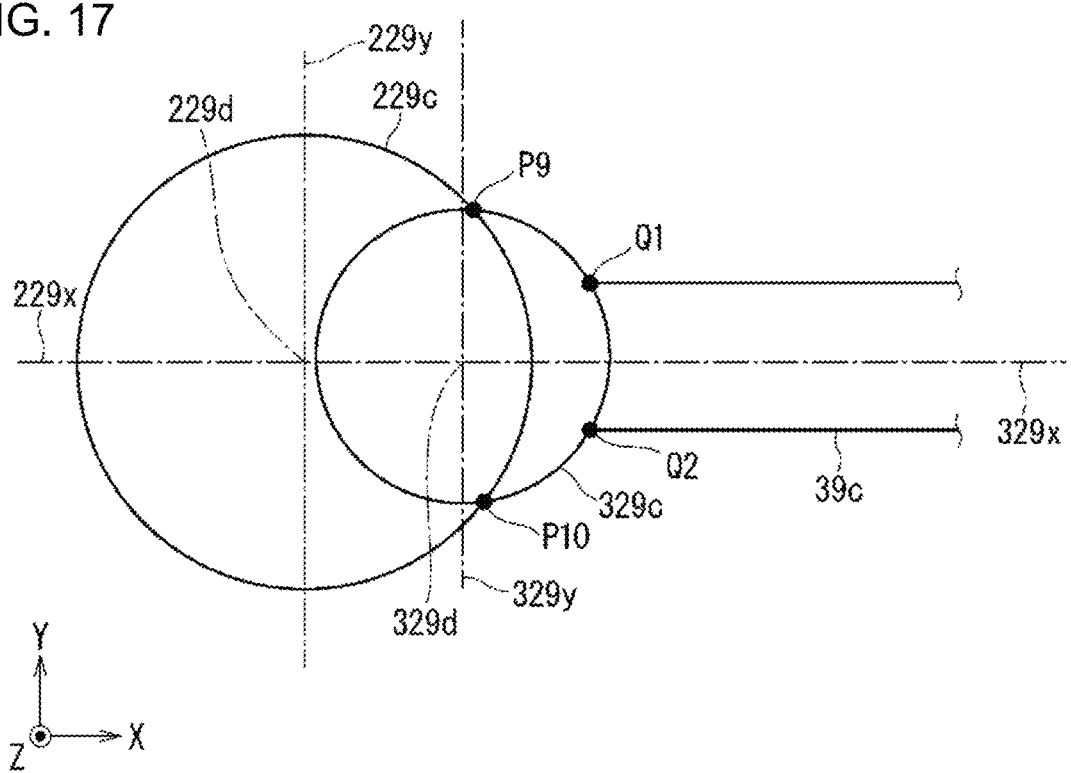
FIG. 17 is a schematic plan view of the exit hole, the flow path, and the through-hole illustrating the positional relationship between their edges as viewed vertically downward (in the −Z direction).

The example of FIG. 17 will now be described. The imaginary line 329x is aligned with the imaginary line 229x. The imaginary line 329y is located in the X direction from the imaginary line 229y. The edge 229c intersects with the edge 329c at points P9 and P10. The edge 229c does not intersect with the edge 39c. The contact portion is an arc of the edge 229c defined by the points P9 and P10 and nearer the intersections Q1 and Q2 as viewed in plan.

Figure 18:
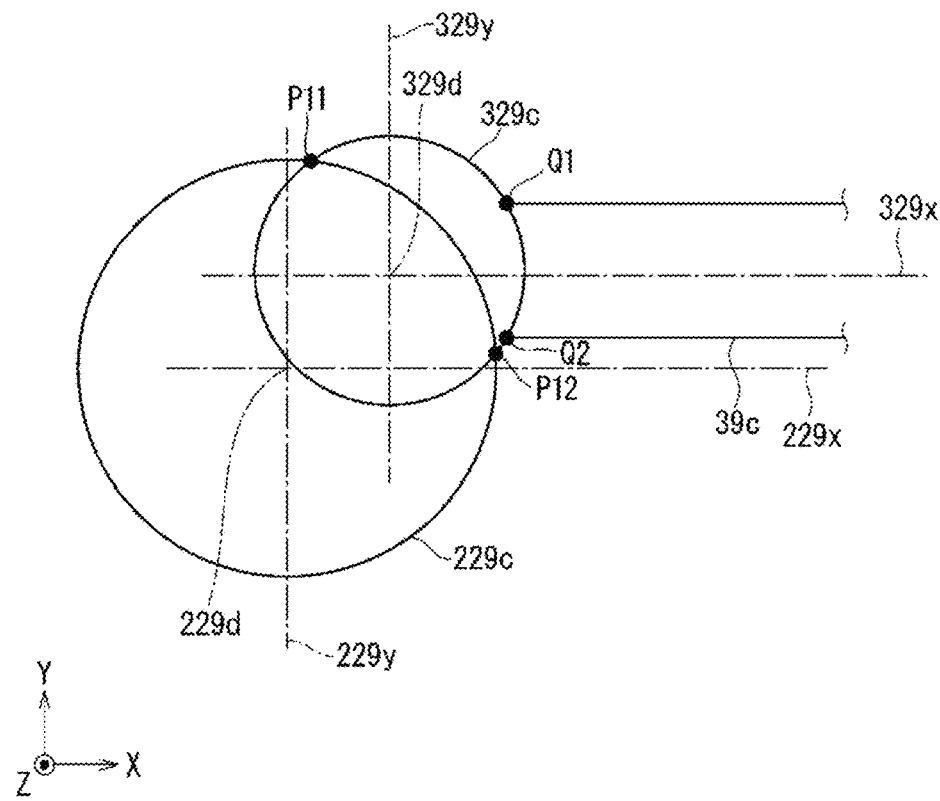
FIG. 18 is a schematic plan view of the exit hole, the flow path, and the through-hole illustrating the positional relationship between their edges as viewed vertically downward (in the −Z direction).

The example of FIG. 18 will now be described. The imaginary line 329x is located in the Y direction from the imaginary line 229x. The imaginary line 329y is located in the X direction from the imaginary line 229y. The edge 229c intersects with the edge 329c at points P11 and P12. The edge 229c does not intersect with the edge 39c. The contact portion is an arc of the edge 229c defined by the points P11 and P12 and nearer the intersections Q1 and Q2 as viewed in plan.

Figure 19:
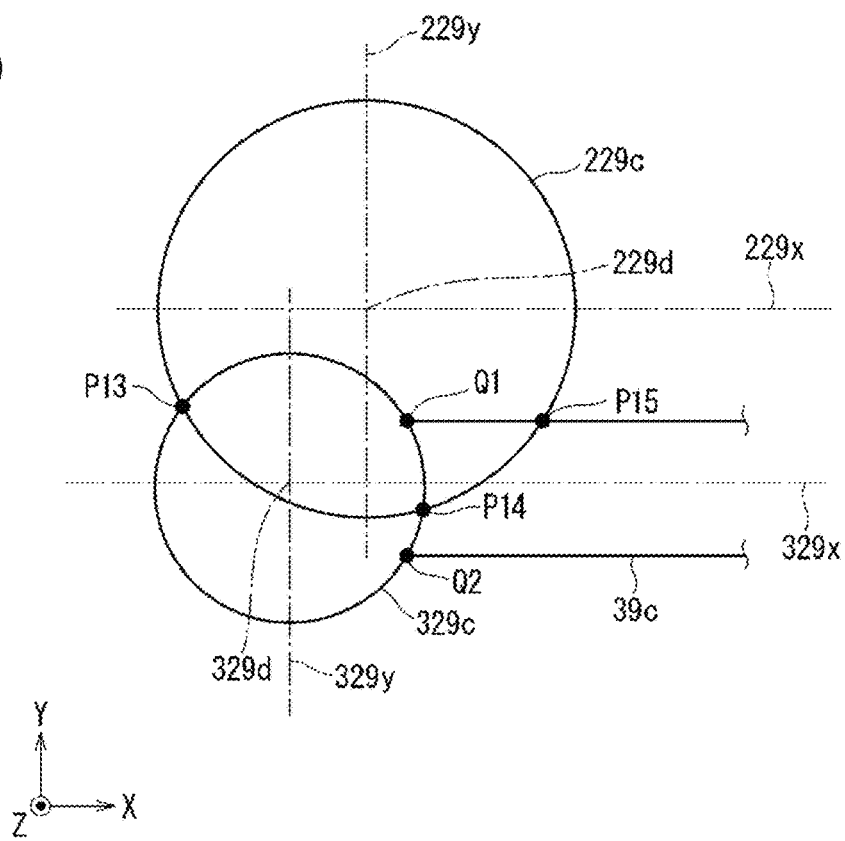
FIG. 19 is a schematic plan view of the exit hole, the flow path, and the through-hole illustrating the positional relationship between their edges as viewed vertically downward (in the −Z direction).

The example of FIG. 19 will now be described. The imaginary line 229x is located in the Y direction from the imaginary line 329x. The imaginary line 229y is located in the X direction from the imaginary line 329y. The edge 229c intersects with the edge 329c at points P13 and P14. The edge 229c intersects with the edge 39c at a point P15. The contact portion is an arc of the edge 229c defined by the points P13 and P15 and passing through the point P14 as viewed in plan.

Figure 20:
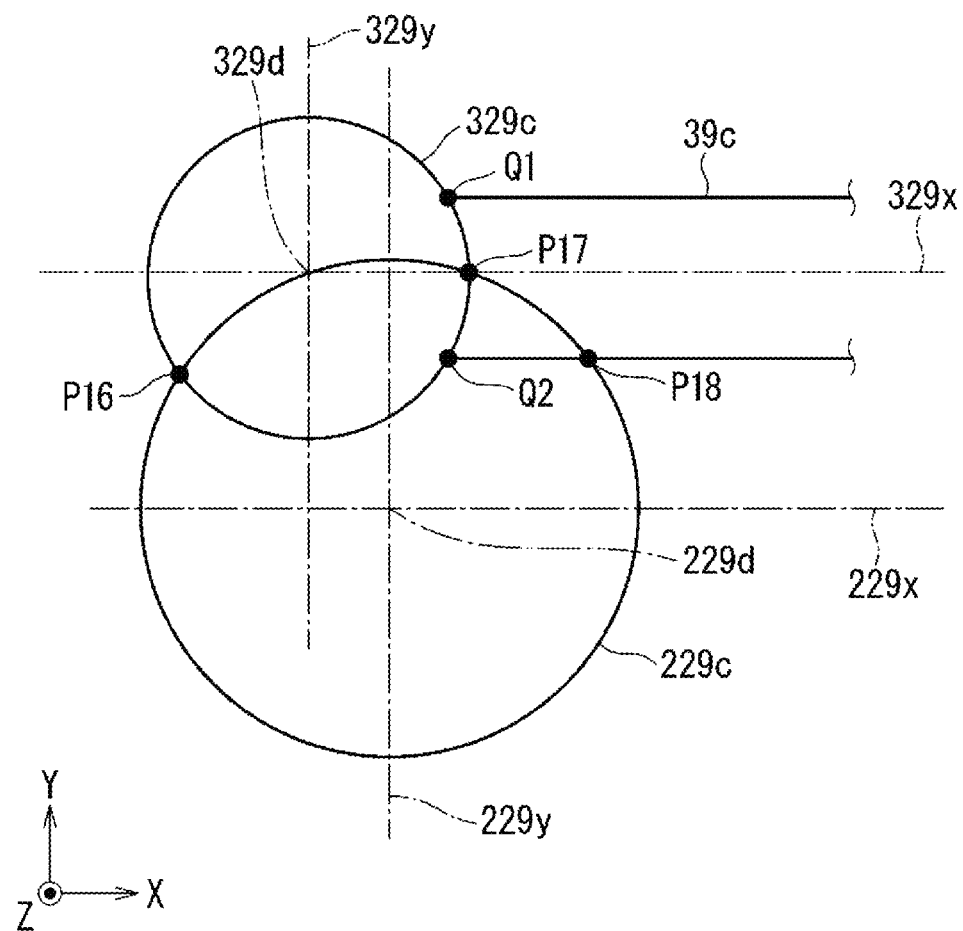
FIG. 20 is a schematic plan view of the exit hole, the flow path, and the through-hole illustrating the positional relationship between their edges as viewed vertically downward (in the −Z direction).

The example of FIG. 20 will now be described. The imaginary line 329x is located in the Y direction from the imaginary line 229x. The imaginary line 229y is located in the X direction from the imaginary line 329y. The edge 229c intersects with the edge 329c at points P16 and P17. The edge 229c intersects with the edge 39c at a point P18. The contact portion is an arc of the edge 229c defined by the points P16 and P18 and passing through the point P17 as viewed in plan.

As illustrated in FIGS. 14 to 20, the device with the features (iii) and (iv-2) or with the feature (v-2) includes the contact portion surrounded by the edge 329c or surrounded by the edge 329c and the edge 39c. The device with these features is likely to include a longer contact portion with the diameter W3 greater than the width d0.

As illustrated and described above, the device with the features (iii) and (iv-2) is likely to include a longer contact portion than with the features (iii) and (iv-1). The device with the features (iii) and (iv-2) facilitates flow of the preprocessing fluid from the exit hole 329 to the through-hole 229, and thus facilitates flow from the exit hole 329 to the entry hole 129.

The device with the feature (v-2) is likely to include a longer contact portion than with the feature (v-1). The device with the feature (v-2) facilitates flow of the preprocessing fluid from the exit hole 329 to the through-hole 229, and thus facilitates flow from the exit hole 329 to the entry hole 129.

4. Variations

The exit hole 329 is not limited to a circular hole but may be an elliptical hole. The edge 329c may be in the shape of an ellipse including a circle. The through-hole 229 is not limited to a circular hole but may be an elliptical hole. The edge 229c may be in the shape of an ellipse including a circle. The entry hole 129 is not limited to a circular hole but may be an elliptical hole.

The preprocessing fluid is optional. The above features that allow the contact portion to be longer facilitate movement of the processing target fluid from the exit hole 329 to the entry hole 129.

The material for the processing device 1 may be an acrylic resin (e.g., polymethyl methacrylate), polycarbonate, or a COP.

The processing device 1 may be a stack of multiple members such as plates. The processing device 1 may be a stack of, for example, a first member and a second member. In this case, the first member may include a bonding surface including grooves corresponding to the mixing flow path 115, the flow paths 111, 112, 113, 114, 116, 117, 118, and 119, the measurement flow path 151, and the reference flow path 152. The second member may include a flat surface. The bonding surface of the first member excluding a portion with the grooves may be bonded to the surface of the second member.

The first member may include recesses and protrusions around the grooves on its bonding surface. The second member may include protrusions and recesses on its surface to be fitted to the recesses and protrusions on the first member.

The components described in the above embodiments and variations may be entirely or partially combined as appropriate unless any contradiction arises.

The invention claimed is:

1. A flow path device, comprising:
   a first device including a groove and an entry hole aligned with the groove in a thickness direction of the flow path device;
   a second device including a first surface, a second surface opposite to the first surface and in contact with the first device, and a first hole extending through and between the first surface and the second surface, the first hole being continuous and aligned with the entry hole in the thickness direction; and
   a third device including a third surface in contact with the first surface, a second hole open in the third surface, the second hole being continuous and aligned with the first hole in the thickness direction, and a flow path directly connected with the second hole and open in the third surface,
   wherein as viewed in a first direction from the first surface to the second surface along the thickness direction,
   the second hole has a diameter greater than a dimension of the flow path in a third direction orthogonal to a second direction in which the flow path extends,
   the first hole has a diameter greater than the diameter of the second hole,
   the second hole has a center surrounded by the first hole, and
   the flow path intersects with the first hole at not more than one point or does not intersect with the first hole.

2. A flow path device, comprising:
   a first device including a groove and an entry hole aligned with the groove in a thickness direction of the flow path device;
   a second device including a first surface, a second surface opposite to the first surface and in contact with the first device, and a first hole extending through and between the first surface and the second surface, the first hole being continuous and aligned with the entry hole in the thickness direction; and
   a third device including a third surface in contact with the first surface, a second hole open in the third surface, the second hole being continuous and aligned with the first hole in the thickness direction, and a flow path directly connected the second hole and open in the third surface,
   wherein as viewed in a first direction from the first surface to the second surface along the thickness direction,
   the second hole has a diameter greater than a dimension of the flow path in a third direction orthogonal to a second direction in which the flow path extends,
   the first hole has a diameter greater than the diameter of the second hole, and
   the second hole has an edge intersecting with an edge of the flow path at two intersections, and at least one of the two intersections is located outward from an edge of the first hole.

3. The flow path device according to claim 2, wherein the second hole is circular or elliptical as viewed in the first direction.

4. The flow path device according to claim 2, wherein the second device includes portions bonded to the third device and the first device with light or plasma.

5. The flow path device according to claim 4, wherein the third device comprises polydimethylsiloxane.

6. The flow path device according to claim 4, wherein the first device comprises a cycloolefin polymer.

7. The flow path device according to claim 4, wherein the second device comprises silicone.

8. The flow path device according to claim 2, wherein the first device is light-transmissive.

9. The flow path device according to claim 1, wherein the second hole is circular or elliptical as viewed in the first direction.

10. The flow path device according to claim 1, wherein the second device includes portions bonded to the third device and the first device with light or plasma.

11. The flow path device according to claim 10, wherein the third device comprises polydimethylsiloxane.

12. The flow path device according to claim 10, wherein the first device comprises a cycloolefin polymer.

13. The flow path device according to claim 10, wherein the second device comprises silicone.

14. The flow path device according to claim 1, wherein the first device is light-transmissive.

15. The flow path device according to claim 1, wherein as viewed in the first direction from the first surface to the second surface along the thickness direction, the flow path intersects with the first hole at a single point.

16. The flow path device according to claim 2, wherein as viewed in the first direction from the first surface to the second surface along the thickness direction, a portion of the first hole is outside of the second hole.

\* \* \* \* \*